United States Patent
Johnson et al.

(10) Patent No.: US 9,927,623 B2
(45) Date of Patent: Mar. 27, 2018

(54) AUTOSTEREOSCOPIC LENTICULAR DISPLAY DEVICE

(71) Applicant: KONINKLIJKE PHILIPS N.V., Eindhoven (NL)

(72) Inventors: Mark Thomas Johnson, Eindhoven (NL); Bart Kroon, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 239 days.

(21) Appl. No.: 14/414,965

(22) PCT Filed: Jul. 15, 2013

(86) PCT No.: PCT/IB2013/055816
§ 371 (c)(1),
(2) Date: Jan. 15, 2015

(87) PCT Pub. No.: WO2014/013419
PCT Pub. Date: Jan. 23, 2014

(65) Prior Publication Data
US 2015/0172640 A1     Jun. 18, 2015

Related U.S. Application Data

(60) Provisional application No. 61/672,827, filed on Jul. 18, 2012.

(51) Int. Cl.
*G02B 27/22* (2006.01)
*H04N 13/04* (2006.01)

(52) U.S. Cl.
CPC ......... *G02B 27/22* (2013.01); *H04N 13/0404* (2013.01); *H04N 2213/001* (2013.01)

(58) Field of Classification Search
USPC .................................. 359/296; 345/85, 107
See application file for complete search history.

(56) References Cited

U.S. PATENT DOCUMENTS

| | | | |
|---|---|---|---|
| 7,307,672 B2 | 12/2007 | Feenstra | |
| 7,812,809 B2 | 12/2010 | Choi | |
| 2002/0186348 A1* | 12/2002 | Covannon | G02B 27/225 351/240 |

(Continued)

FOREIGN PATENT DOCUMENTS

| | | |
|---|---|---|
| WO | 2005109392 A1 | 11/2005 |
| WO | 2012176113 A1 | 12/2012 |

OTHER PUBLICATIONS

Yang, S. "High Reflectivity Electrofluidic Pixels with Zero-Power Grayscale Operation", Applied Physics Letters, vol. 97, No. 14, Oct. 2010, pp. 143501.

(Continued)

*Primary Examiner* — Ricky Mack
*Assistant Examiner* — Journey Sumlar

(57) ABSTRACT

An autostereoscopic display device comprises a display panel and a lenticular array provided over the display panel. The lenticular array comprises an array of lenticular lenses each having a parallel elongate axis and arranged side by side in a pitch direction. The display panel comprises a shutter type display, with a transition between light modulating state involving movement of the light modulating medium generally in a direction perpendicular to the lenticular pitch direction.

20 Claims, 11 Drawing Sheets

(56) References Cited

U.S. PATENT DOCUMENTS

| | | |
|---|---|---|
| 2005/0162378 A1 | 7/2005 | Zhou |
| 2006/0285067 A1 | 12/2006 | Kim |
| 2010/0225986 A1 | 9/2010 | Missbach |
| 2011/0181706 A1 | 7/2011 | Harrold |
| 2012/0086776 A1 | 4/2012 | Lo |
| 2013/0120837 A1* | 5/2013 | Zuidema .............. G02B 3/0043 359/463 |
| 2013/0208356 A1 | 8/2013 | Saito |

OTHER PUBLICATIONS

Heikenfeld, J. "Electrofluidic Displays using Young-Laplace Transposition of Brilliant Pigment Dispersions", Nature Photonics, vol. 3, No. 5, 2009, pp. 292-296.
Benson, Brad et al "Reflective Full Color Electrokinetic Displays", International Display Workshops, 2011.
Feenstra, Johan et al "Electrowetting Displays", Liquavista 2009.
Lee, Wei-Yen et al "A Stacking Color Electrowetting Display for the Smart Window Application", Society for Information Display (SID) 2011.
Lenssen, J.M.H. et al "Bright E-Skin Technology and Applications: Simplified Gray-Scale e-Paper", Journal of the SID, vol. 19, No. 1, pp. 1-7, 2011.
Matsuoka, Toshiki et al "A Novel Non-Emissive Display with Enormous Contrast Ratio and Viewing-Angle Free", Society for Information Display (SID), pp. 381-383, 2011.
Mourey, Devin A. et al "Amorphous Oxide Transistor Electrokinetic Reflective Display on Flexible Glass", Society for Information Display, Proceedings of the International Workshop on Displays, 2011.

* cited by examiner (a)

(b)

AUTOSTEREOSCOPIC LENTICULAR DISPLAY DEVICE

CROSS-REFERENCE TO PRIOR APPLICATIONS

This application is the U.S. National Phase application under 35 U.S.C. § 371 of International Application No. PCT/IB2013/055816, filed on Jul. 15, 2013, which claims the benefit of U.S. Provisional Patent Application No. 61/672,827, filed on Jul. 18, 2012. These applications are hereby incorporated by reference herein.

FIELD OF THE INVENTION

This invention relates to an autostereoscopic display device of the type that comprises a display panel having an array of display pixels for producing a display and an imaging arrangement for directing different views to different spatial positions.

BACKGROUND OF THE INVENTION

A first example of an imaging arrangement for use in this type of display is a barrier, for example with slits that are sized and positioned in relation to the underlying pixels of the display. The viewer is able to perceive a 3D image if his/her head is at a fixed position. The barrier is positioned in front of the display panel and is designed so that light from the odd and even pixel columns is directed towards the left and right eye of the viewer.

A drawback of this type of two-view display design is that the viewer has to be at a fixed position, and can only move approximately 3 centimeters to the left or right. In a more preferred embodiment there are not two sub-pixel columns beneath each slit, but several. In this way, the viewer is allowed to move to the left and right and to perceive a stereo image in his eyes all the time.

The barrier arrangement is simple to produce but is not light efficient. A preferred alternative is therefore to use a lens arrangement as the imaging arrangement. For example, an array of elongate lenticular elements can be provided extending parallel to one another and overlying the display pixel array, and the display pixels are observed through these lenticular elements.

The lenticular elements are provided as a sheet of elements, each of which comprises an elongate semi-cylindrical lens element. The lenticular elements ("lenticules") extend in the column direction of the display panel, with each lenticular element overlying a respective group of two or more adjacent columns of display pixels.

In an arrangement in which, for example, each lenticule is associated with two columns of display pixels, the display pixels in each column provide a vertical slice of a respective two dimensional sub-image. The lenticular sheet directs these two slices and corresponding slices from the display pixel columns associated with the other lenticules, to the left and right eyes of a user positioned in front of the sheet, so that the user observes a single stereoscopic image. The sheet of lenticular elements thus provides a light output directing function.

In other arrangements, each lenticule is associated with a group of four or more adjacent display pixels in the row direction. Corresponding columns of display pixels in each group are arranged appropriately to provide a vertical slice from a respective two dimensional sub-image. As a user's head is moved from left to right, a series of successive, different, stereoscopic views are perceived creating, for example, a look-around impression.

A lenticular arrangement can be used to create an autostereoscopic display device for any underlying native 2D display panel. However, different display technologies give rise to different technical issues.

This invention is concerned in particular with the combination of shutter based displays with lenticular lens arrangement. The invention is thus directed to a subset of the reflective, transmissive and transflective displays. This type of display has a pixel for which, in one extreme state, the light-modulating part is confined to a small area, and while in the other extreme state, substantial parts of the pixel have this light-modulating property.

Examples of display technology, of which at least some variants are within the scope of this invention, are electrowetting displays, electrophoretic displays, electrofluidic displays and MEMS-type displays.

A problem with the use of this type of display is that the pixel shape and area changes for different grey levels or when making a transition between modulation levels. This can give rise to visual artefacts, particularly when used in conjunction with a lenticular array.

SUMMARY OF THE INVENTION

The invention provides an apparatus and method as defined in the independent claims. The dependent claims define advantageous embodiments.

In one aspect, the invention provides an autostereoscopic display device comprising a display panel comprising rows and columns of pixels, and a lenticular array provided over the display panel, wherein the lenticular array comprises an array of lenticular lenses each having a parallel elongate axis, wherein the display panel comprises light modulating pixels in which the degree of light modulation is controllable between at least two states, a first state in which a light modulating medium occupies a first area of the pixel and a second state in which the light modulating medium occupies a second area of the pixel, wherein the transition between first and second states involves movement of the light modulating medium generally in a first direction, wherein the first direction is within 10 degrees of the elongate axis or within 10 degrees of the pixel column direction, or between the elongate axis and the pixel column direction.

arrangement provides a roll out direction of the shutter in a shutter-type display in the direction of the lens axes. The roll out direction is close to the pixel column direction or the lens axis direction, or between them. This reduces visual artefacts in the 3D display output.

The first direction is for example the direction from the centre of area of the first area to the centre of area of the second area. This defines a general shutter opening and closing direction.

The first direction is preferably parallel to the elongate axis direction.

In the first state, the light modulating medium can occupy a reservoir area. This reservoir area can be considered to be the smallest pixel area. The reservoir area is preferably an elongate shape perpendicular to the elongate axis direction. Thus, the reservoir shape is across the lens axis direction and the roll out direction is along the lens axis direction.

The lenticular array and the reservoir shapes and positions can be chosen such that each 3D view interacts with an equal amount of pixel reservoir area. The lenticular array design and the maximum light-modulating shape and positions can also be chosen such that each 3D view interacts with an equal amount of the maximum light-modulating shapes of the pixels.

The display panel can comprises an electrophoretic display panel, an electrowetting display panel or a MEMS shutter based display panel.

In another aspect, the invention provides a method of controlling an autostereoscopic display device which comprises a display panel comprising rows and columns of pixels, and a lenticular array provided over the display panel, wherein the lenticular array comprises an array of lenticular lenses each having a parallel elongate axis, wherein the method comprises controlling the degree of light modulation of the pixels between at least two states, a first state in which a light modulating medium occupies a first area of the pixel and a second state in which the light modulating medium occupies a second area of the pixel, wherein the transition between first and second states involves movement of the light modulating medium generally in a first direction, wherein the first direction is within 10 degrees of the elongate axis or within 10 degrees of the pixel column direction, or between the elongate axis and the pixel column direction.

BRIEF DESCRIPTION OF THE DRAWINGS

Embodiments of the invention will now be described, purely by way of example, with reference to the accompanying drawings, in which.

DETAILED DESCRIPTION OF EMBODIMENTS

The invention provides an autostereoscopic display device comprising a display panel and a lenticular array provided over the display panel. The lenticular array comprises an array of lenticular lenses each having a parallel elongate axis and arranged side by side in a pitch direction. The display panel comprises a shutter type display, with a transition between light modulating state involving movement of the light modulating medium generally in a direction perpendicular to the lenticular pitch direction.

Figure 1:
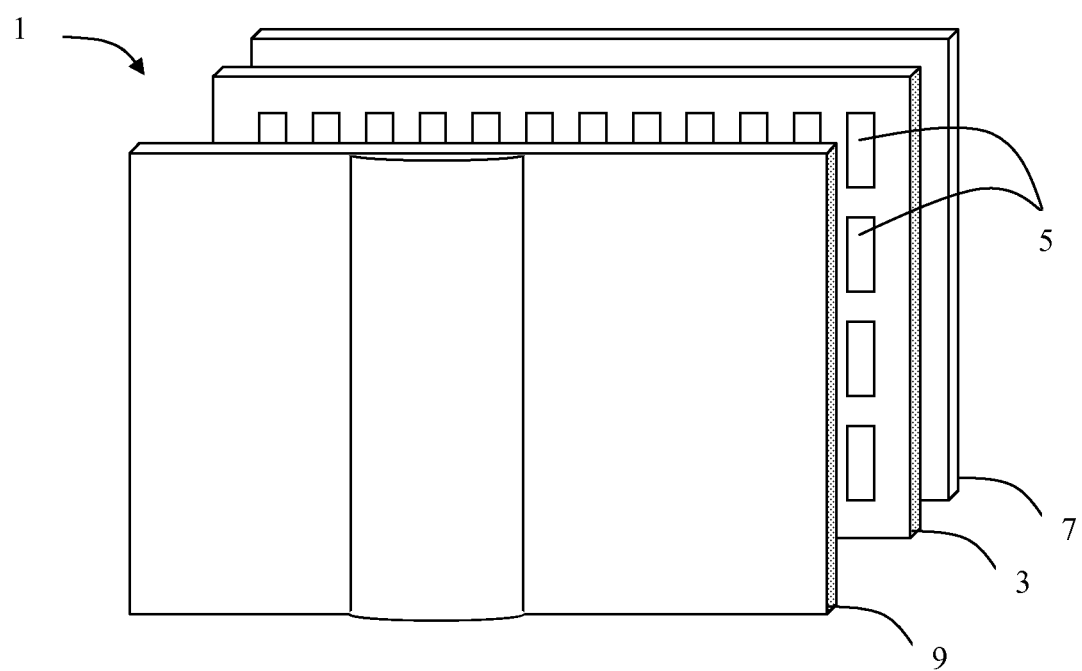
FIG. 1 is a schematic perspective view of a known autostereoscopic display device.

FIG. 1 is a schematic perspective view of a known direct view autostereoscopic display device 1. Typically, a liquid crystal display panel 3 of the active matrix type is used, that acts as a spatial light modulator to produce the display.

The display panel 3 has an orthogonal array of display pixels 5 arranged in rows and columns. For the sake of clarity, only a small number of display pixels 5 are shown in the FIG. 1. In practice, the display panel 3 might comprise about one thousand rows and several thousand columns of display pixels 5.

The structure of the liquid crystal display panel 3 can be entirely conventional. The display panel 3 is illuminated by a light source 7 comprising, in this case, a planar backlight extending over the area of the display pixel array. Light from the light source 7 is directed through the display panel 3, with the individual display pixels 5 being driven to modulate the light and produce the display.

The display device 1 also comprises a lenticular sheet 9, arranged over the display side of the display panel 3, which performs a view forming function. The lenticular sheet 9 comprises a row of lenticular elements extending parallel to one another, of which only one is shown with exaggerated dimensions for the sake of clarity.

The lenticular elements are in the form of convex cylindrical lenses, and they act as a light output directing means to provide different images, or views, from the display panel 3 to the eyes of a user positioned in front of the display device 1.

The autostereoscopic display device 1 shown in FIG. 1 is capable of providing several different perspective views in different directions. In particular, each lenticular element overlies a small group of display pixels 5 in each row. The lenticular element projects each display pixel 5 of a group in a different direction, so as to form the several different views. As the user's head moves from left to right, his/her eyes will receive different ones of the several views, in turn.

Figure 2:
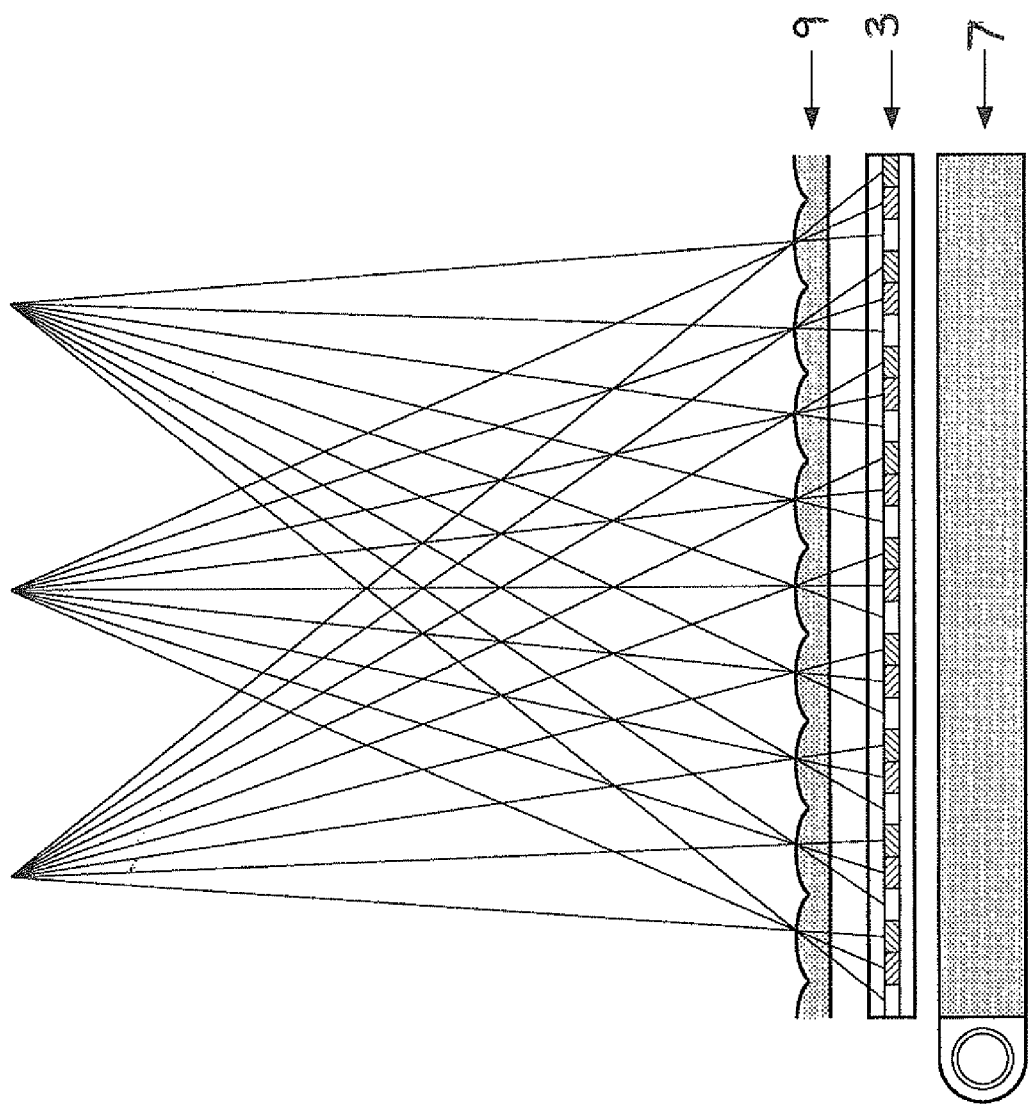
FIG. 2 shows how a lenticular array provides different views to different spatial locations.

FIG. 2 shows the principle of operation of a lenticular type imaging arrangement as described above and shows the backlight 7, display device 3 such as an LCD and the lenticular array 9. FIG. 2 shows how the lenticular arrangement 9 directs different pixel outputs to different spatial locations.

This invention relates to lenticular autostereoscopic displays which use a different type of native display to the conventional LCD display. In particular, the invention makes use of a "shutter" based display. Various examples are described below, before the explanation of the invention.

A first class of shutter type display is an electrowetting display, based on the interaction of coloured oil droplets inside water making use of electrostatic and surface tension forces.

Figure 3:
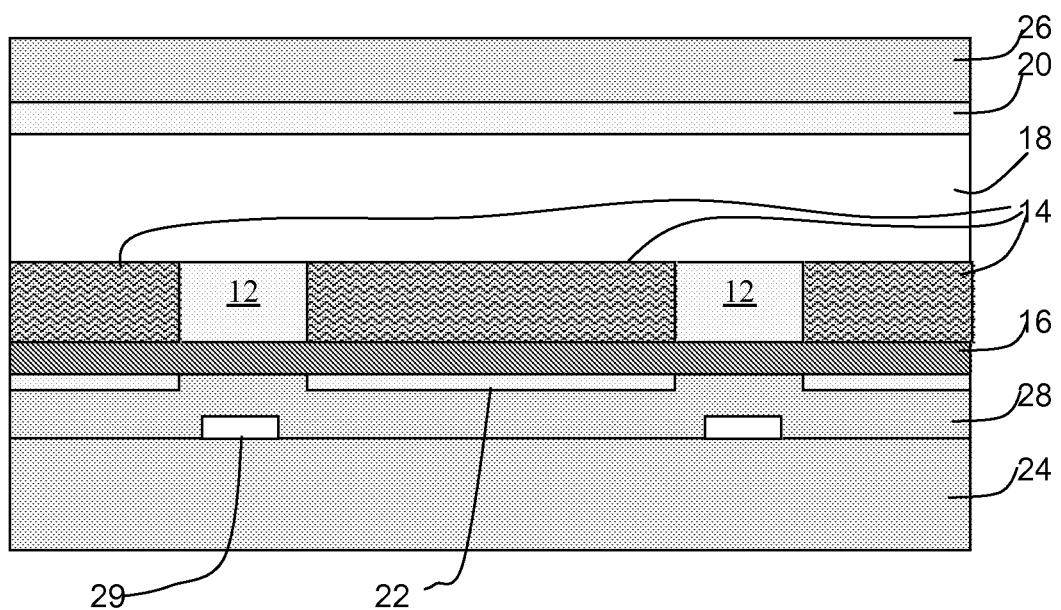
FIG. 3 shows a known display pixel of an electrowetting display in cross section and in plan view, and in a first display state.
Figure 3:
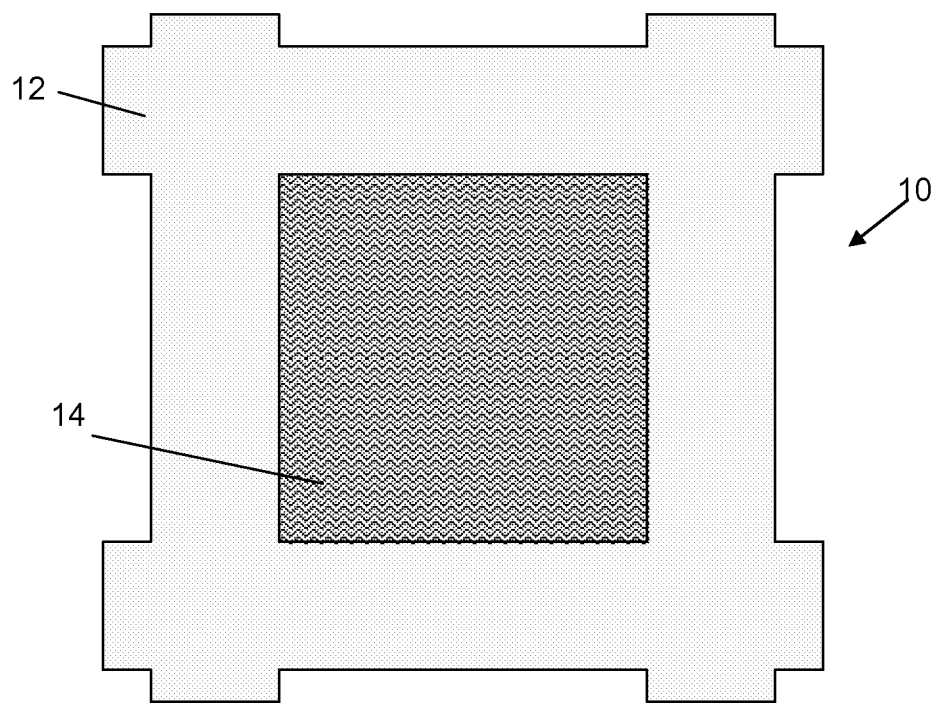

A known electrowetting display device comprises an array of cells, each of which is filled with a layer of coloured oil. FIG. 3 shows one cell 10 in cross section (top image) and in plan view (bottom image). Each cell 10 forms a pixel in the display, and is separated from its neighbour by cell walls 12 which contain a coloured oil 14 of the cell.

The cell walls are in the form of a grid which is attached to a hydrophobic insulating layer 16 which forms the base of the cell. Above the cells is a layer of conductive water 18, which is common to all cells. Electrical contact is made to the conductive water via a transparent common electrode 20. Within each cell is a separate pixel electrode 22 which permits application of a voltage individually to the base of each cell.

The conductive water 18 is in practice a polar conductive salt solution and the oil is an insulating silicone oil or an alkane, and is coloured with a dye or pigment. The two liquids are immiscible.

The display cells are provided between a lower substrate 24 and a glass top plate 26. An insulating passivation layer 28 is provided between the substrate 24 and the pixel electrodes 22. The cells each have a control TFT contained within the passivation layer 28, and these TFTs form an active matrix array. Row and column electrodes are also provided, which enable connection to the integrated circuit drivers. Column electrodes are shown as 29 in FIG. 3.

In the absence of any external applied voltage, the oil spreads out over the hydrophobic insulating layer 16 at the base of a pixel cell, and this defines what is termed the "closed" state, in which both the optical reflectivity and transmission through a cell are low.

When a voltage of sufficient magnitude is applied between the pixel electrode 22 of a particular cell and the common electrode 20, the oil recedes to one edge or corner of the cell, bulging up in the vertical direction alongside the cell wall. Specifically, the application of an external electric field across a cell adjusts the energy balance of the water-oil-hydrophobic insulator system, making it favourable for the water to be in contact with the hydrophobic insulator as opposed to the oil.

Figure 4:
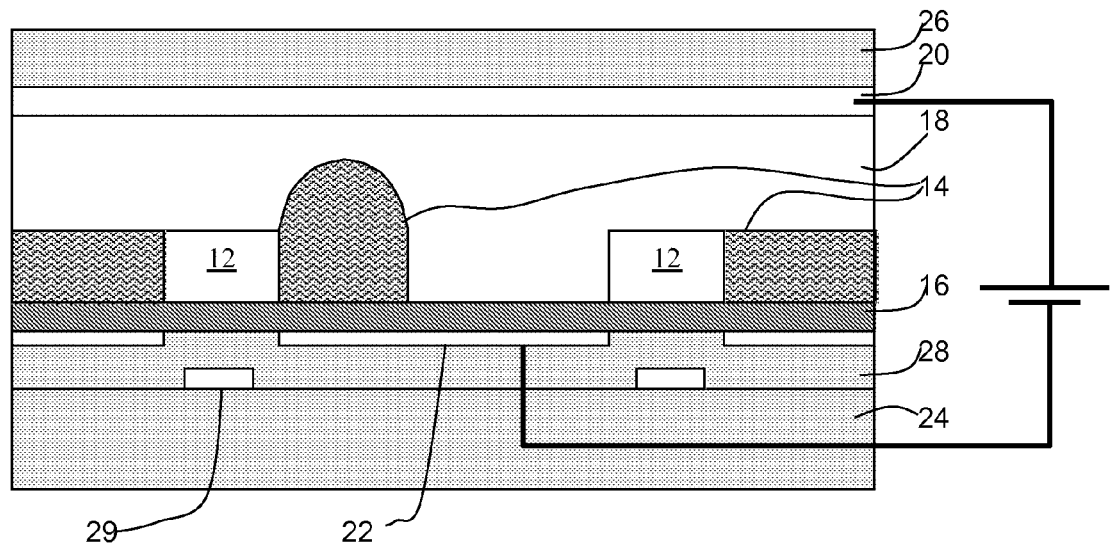
FIG. 4 shows the known display pixel of FIG. 3 in a second display state.
Figure 4:
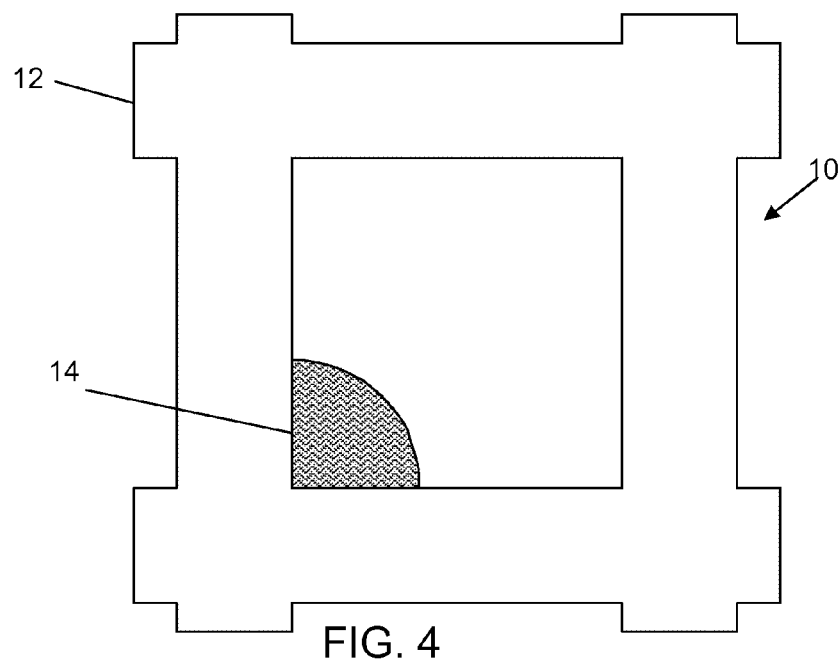

FIG. 3 shows the closed state of the cell, and FIG. 4 shows the open state of the same cell. When the water is brought into contact with the hydrophobic layer, the oil is displaced as shown in FIG. 4, typically to a corner of the cell area.

Thus, without a voltage applied, the oil covers the hydrophobic insulator such that the entire pixel has the colour of the pigment. When a voltage is applied, the water is drawn towards the insulator and the oil is pushed aside. In this state only a small part of the cell has pigment and most of the cell is simply transmissive.

By adding a reflector, the transmissive effect can be turned into a reflective one and a partial reflector in combination with a backlight gives a transflective display.

A full-colour display can be made by spatial multiplexing, for example RGB stripes, but more contrast and gamut is achieved by stacking layers with subtractive colours (for example CMY or cyan-magenta-yellow-black, CMYK).

Instead of only changing the shape of the droplets, it is also possible to apply electrowetting forces to move droplets in or out of view.

Figure 5:
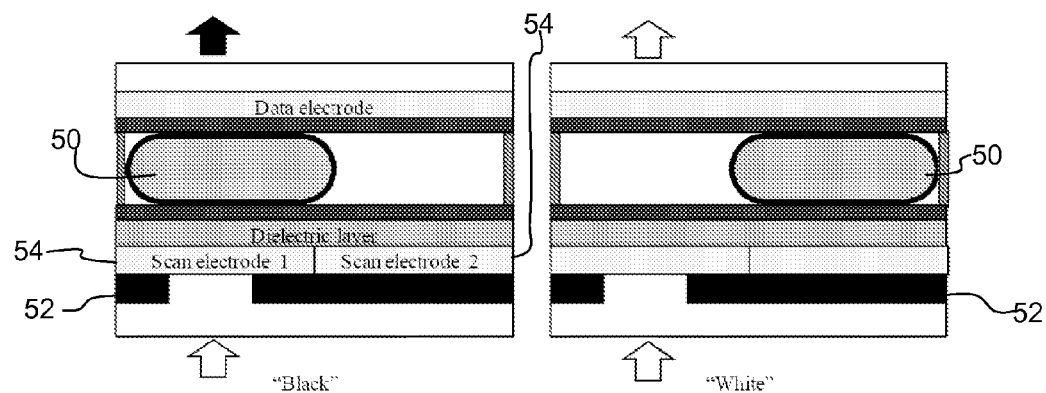
FIG. 5 shows a known display technology using moving droplets.

FIG. 5 shows an example where a droplet 50 is moved between a position in which it is over an opening in a black mask layer 52 (left image) to a position in which it is laterally displaced (right image). Each pixel has two scan electrodes 54 for controlling the droplet movement. A full-colour display can be made out of movable droplets. The driving scheme is used to control the surface tension within a cell to move a droplet.

Figure 6:
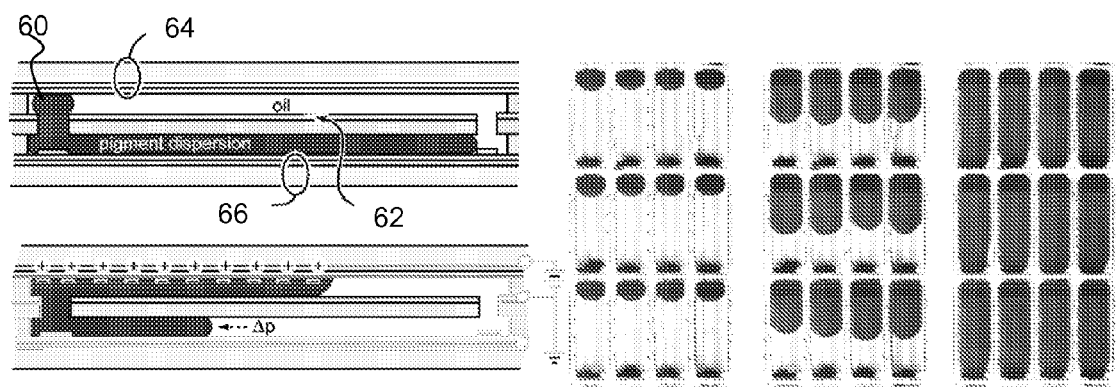
FIG. 6 shows a known display technology using a display layer over a chamber layer, with a light modulating medium which can be moved between the layers.

Another approach is disclosed in S. Yang, "*High reflectivity electrofluidic pixels with zero-power grayscale operation*", Applied Physics Letters, vol. 97, no. 14, p. 143501, 2010. In this case, the reservoir is hidden and fluid is moved in between a top and bottom layer. This approach is shown in FIG. 6. The pigment dispersion 60 is shared between top and bottom chambers. A reflective electrode 62 is between the chambers, so that the level of filling of the top chamber defines the pixel appearance. The two chambers are between top and bottom Electrowetting substrates 64, 66. Different grey levels result in a different amount of pigment over the pixel, but spread non-uniformly over the pixel, as can be seen in the right image.

Another general type of shutter based display, similar to the droplet-moving type of electrowetting, makes use of two effects, namely electrowetting pressure and Young-Laplace pressure. The display technology is termed an electrofluidic display, and it essentially makes use of electrowetting in combination with micro-fluidic channels. This technology is described in J. Heikenfeld, "*Electrofluidic displays using Young-Laplace transposition of brilliant pigment dispersions*", Nature Photonics, vol. 3, no. 5, pp. 292-296, 2009.

Figure 7:
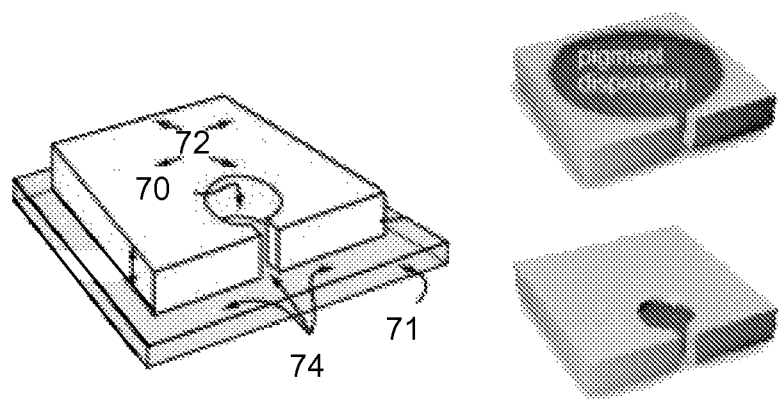
FIG. 7 shows a known display technology using a channel and reservoir for holding a pigment.
Figure 7:
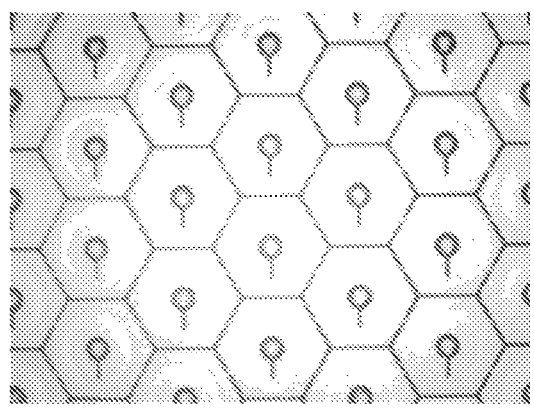

A typical display cell is shown in FIG. 7. The cell comprises a reservoir 70 defined in a polymer channel 72, with a duct 74 leading to the reservoir. The pigment is dispersed in watery fluid and the chambers have a hydrophobic coating. The pigment-holding fluid is surrounded by an oily fluid (typically clear or black) and through the duct, when one fluid moves then the other fluid can counteract the movement. Without any voltage, due to the Young-Laplace pressure the fluid recoils into the reservoir because the reservoir is round while the top channel is thin so the reservoir has a lower energy state. When a voltage is applied to the electrodes, then electrowetting forces dominate the other effect and the fluid with pigment can be made to cover the entire pixel. The two states are shown to the right of FIG. 7(*a*), and the appearance of pixels in the open state is shown in FIG. 7(*b*).

Figure 8:
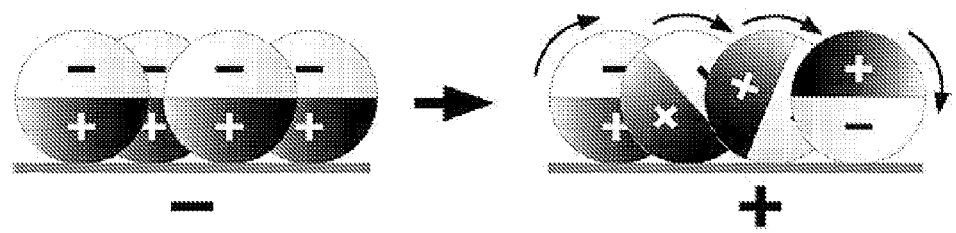
FIG. 8 shows a known display technology using rotating particles.

Another example is known as a "Gyricon sheet". This is a thin layer of transparent plastic in which millions of small beads are randomly dispersed. The beads, each contained in an oil-filled cavity, are free to rotate within those cavities. The beads are "bichromal" with hemispheres of two contrasting colours (e.g. black and white, red and white), and charged so they exhibit an electrical dipole. When voltage is applied to the surface of the sheet, the beads rotate to present one coloured side to the viewer. Voltages can be applied to the surface to create images such as text and pictures. The image will persist until new voltage patterns are applied FIG. 8 schematically shows the principle of operation, with one applied voltage (left image) and the transition to the opposite voltage (right image).

Another general type of display technology uses electrophoresis. This concerns movement of charged particles in a fluid (a colloidal mixture) or gas in response to a uniform electric field. Examples of electrophoretic displays are E Ink™ or Bridgestone™ technology applied in various electronic book reader applications.

Figure 9:
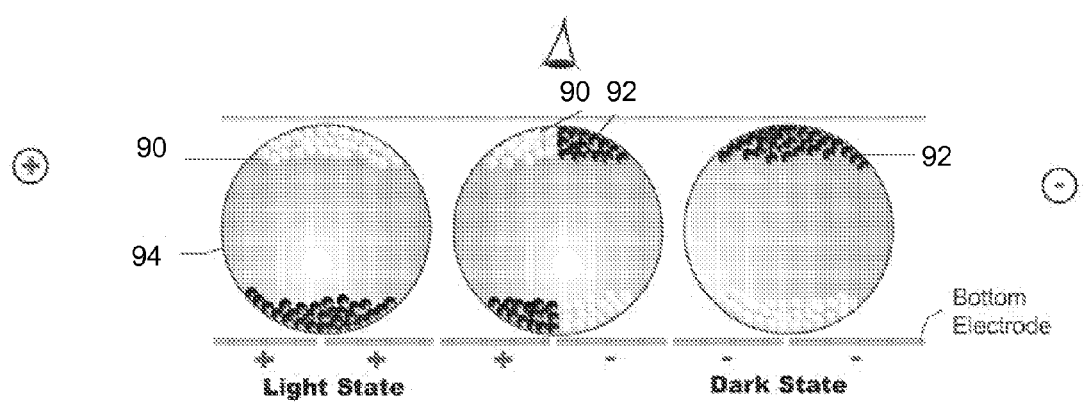
FIG. 9 shows a known display technology using two types of moving charged particles.

As shown in FIG. 9, E Ink uses two types of particles 90,92 with opposite charge, one white 90 and the other black 92, inside cells 94 formed by a plastic foil. Applying a voltage over the top and bottom electrode causes the particles to migrate.

The Bridgestone technology, dubbed quick response liquid powder display (QR-LPD), is similar to E Ink in having two oppositely charged types of particles, but replaces the liquid by gas. By changing the voltage over the plates, either the white or black particles will "stick" to the front plate. Having gas instead of liquid allows for a reported response time of only 200 microseconds.

Figure 10:
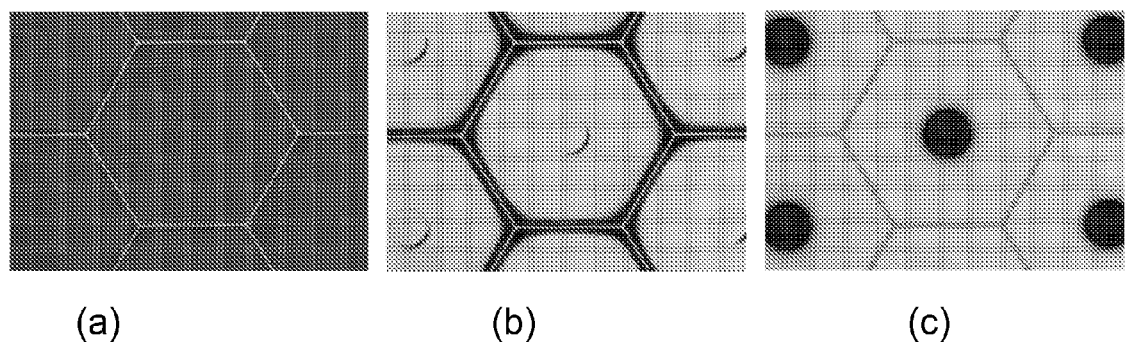
FIG. 10 shows a known display technology using in-plane electrophoresis.

With in-plane electrophoresis, in one extreme state the particles are all packed in a reservoir, while in the other extreme state they are uniformly spread over the cell. This behaviour is shown in FIG. 10 in which FIG. 10(a) shows the on state, FIG. 10(b) shows the off-state with attraction to hexagonal walls, and FIG. 10(c) shows attraction to central dots.

It is possible to modify this design to provide many small attraction centres per pixel instead of one larger central reservoir. This creates a good uniform behaviour but for displays it is more typical to have one attraction centre per pixel.

Figure 11:
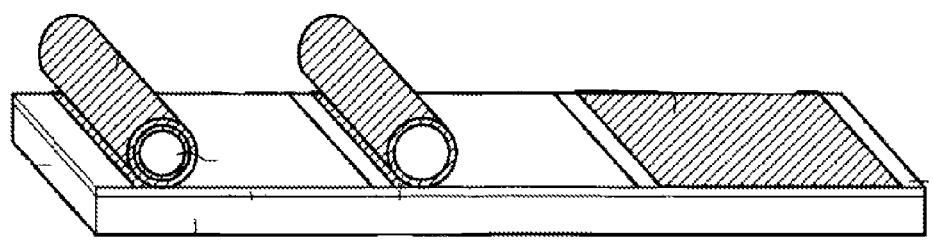
FIG. 11 shows a known display technology using a MEMS rollable shutter.

Another class of display is MEMS-type displays such as roll-blinds which function by rolling or unrolling a coil. FIG. 11 shows schematically the approach, taken from WO-2005/109392

For the purposes of this invention, the above types of display will generally be referred to as "shutter-type" displays, in that they rely on movement within the pixel structure to allow the passage of light or block the passage of light. The movement within the pixel structure gradually closes the pixel aperture.

Figure 12:
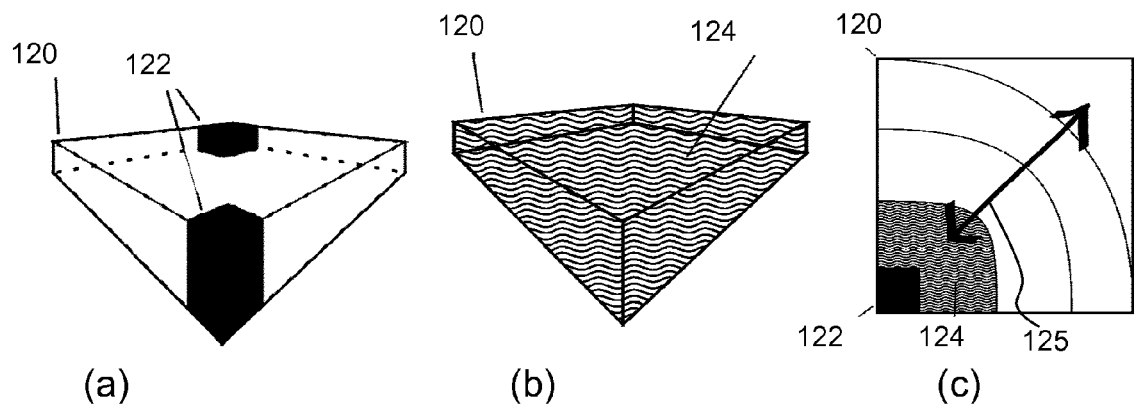
FIG. 12 shows generally how shutter based displays change their display state.

A general shutter-type electro-optical display is represented in FIG. 12. Each pixel comprises a volume 120 that has a controllable light modulating effect. FIG. 12(a) shows the minimum light modulating effect with the fluid located at a reservoir 122. Two reservoirs 122 can be seen; one for the pixel and one for an adjacent pixel behind. FIG. 12(b) shows the maximum light modulating effect with the fluid spread across the cell, and FIG. 12(c) shows non-uniform light modulation at transitions or grey levels 124.

The arrow 125 in FIG. 12(c) represents a roll out direction. This is the direction between the area of the pixel in a first off state (in which the light modulating medium occupies a minimum first area of the pixel) and a second on state (in which the light modulating medium occupies a maximum second area of the pixel).

The direction is the general roll out direction of the pixel. It can be defined more concisely the direction from the centre of area ("centroid") of the first area (i.e. the area centre of the reservoir 122) to the centre of area of the second area (i.e. the area centre of the pixel aperture).

In the extreme state of FIG. 12(a), the light-modulating part is confined to the small reservoir area 122. Depending on the technology, this could for instance be a coiled-up bimetal or a pigment reservoir. In the case of the structure of FIG. 6 it is the area occupied in the top chamber. The term "reservoir" should be understood accordingly as covering all of these possibilities.

Figure 13:
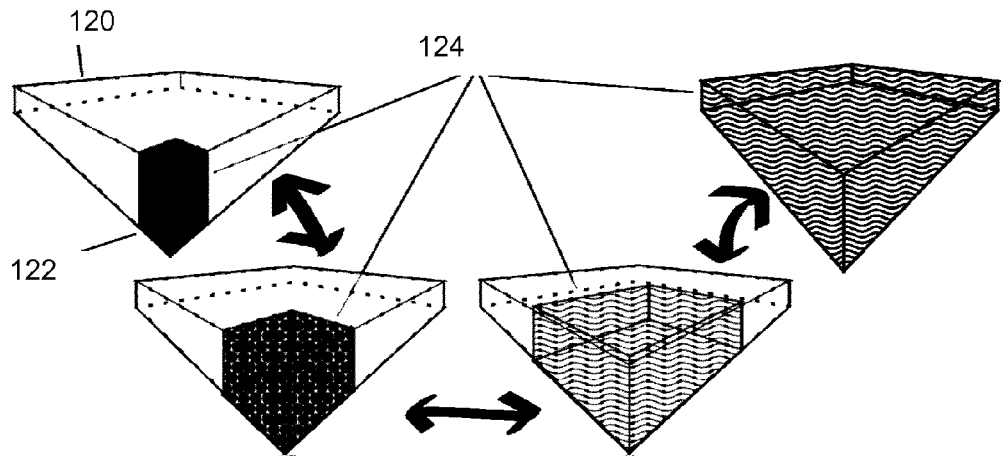
FIG. 13 shows intermediate states for the display technology of FIG. 12.

In the other extreme state of FIG. 12(b), substantial parts of the pixel have a light-modulating property. In the transition from one state to another as shown in FIG. 13 or at intermediate (grey) levels, the light-modulating property may be unevenly spread over the volume. Also, multiple independently controllable light-modulating effects may exist within one enclosure (for example multiple pigments), and they can be stacked to form a full-colour display. Depending on the implementation, the required number of layers can be only one, two or three. It is also possible to have more than three layers is beneficial.

Even in the minimum light-modulating state, some parts of the pixel volume will still modulate the light. This may cause reduced transmittance and/or reflectance leading to reduced contrast or reduced brightness. This may also result in banding effects.

Figure 14:
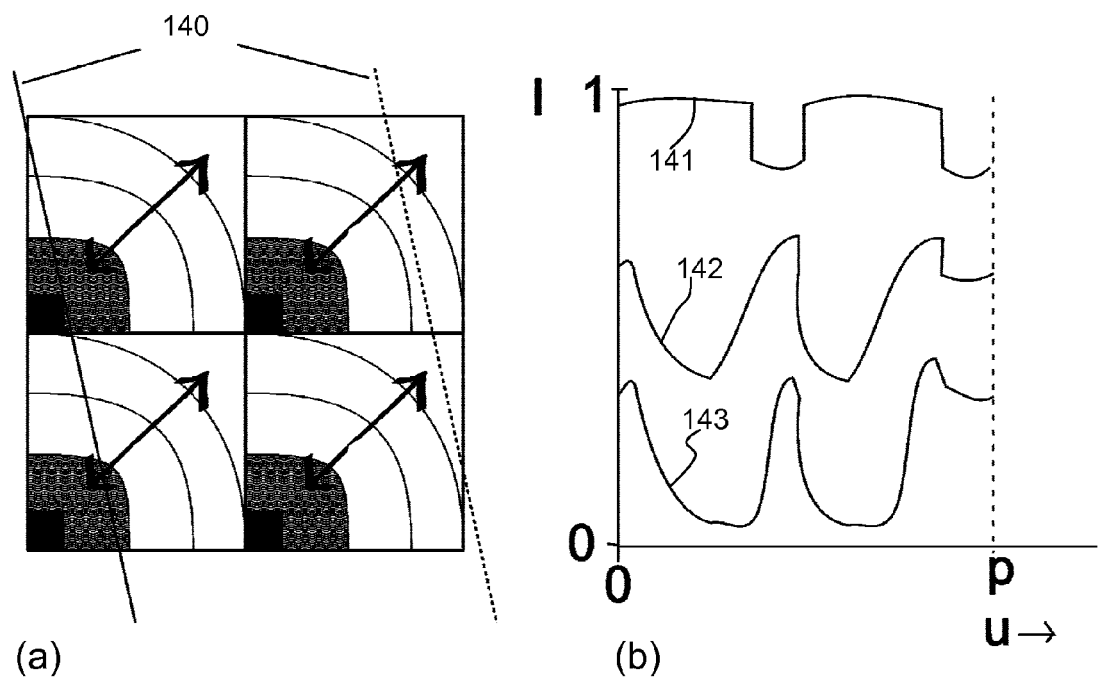
FIG. 14 is used to explain the problem with regard to the display of FIG. 12.

The problems are related, and banding effects may simply be considered to be a non-uniform reduction in contrast or brightness. Causes for the problems are:

(i) Pixel shape while "rolling" out. FIG. 14(a) shows the pixel shape changing while rolling out the light-modulating part. Different intensity profiles are created as shown in FIG. 14(b).

FIG. 14(b) plots the position u along the width direction of the lens, from 0 to p where p is the lens pitch, versus the intensity I of the light modulating effect. Thus, the figure shows the intensity variation across the lens pitch, and for three different light modulation settings (black is the top plot 141, grey is the middle plot 142 and white is the bottom plot 143). The fact that these plots vary for different positions across the lens pitch means there are variations between views, since each position across the lens width corresponds to a different light output direction.

This, if any of the intermediate profiles is non-uniform (e.g. not a flat line), then banding is observed at transitions or at grey levels. This problem would be particularly visible for a non-static user with moving content (transitions) or with opaque grey levels.

(ii) Often the reservoir is deliberately covered by an opaque layer, but otherwise it retains a light-modulating effect, even in the off-state of the pixel. In the case of semi-translucent inks, the reservoir could have a stronger light-modulating effect as more ink is contained in a small area.

Figure 15:
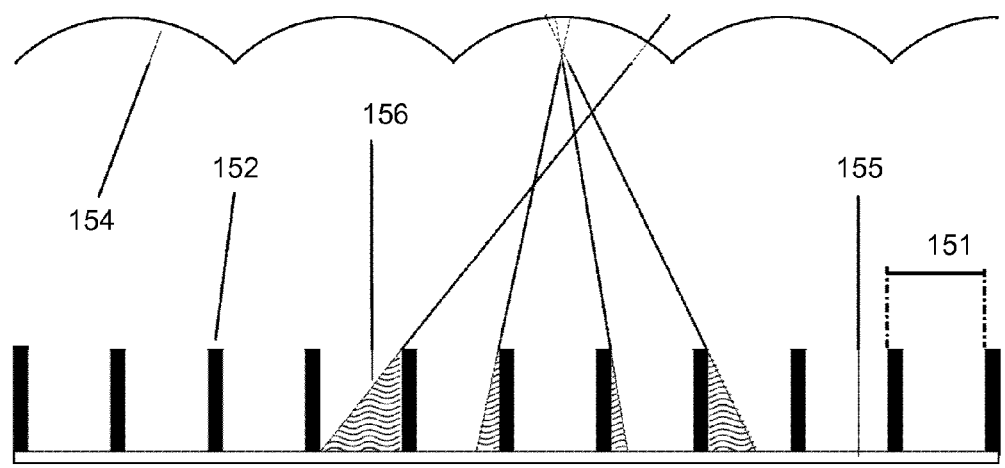
FIG. 15 shows a known a further problem relating to the thickness of light blocking areas.

(iii) The reservoir thickness. FIG. 15 shows a side-view of a lenticular display with volumes 151, reservoirs 152, a lenticular lens interface 154 and a reflector and/or backlight 155. From FIG. 15, it is clear that the (exaggeratedly) thick reservoirs 152 have relatively more impact on off-centre views. Shadows 156 are shown for areas that are obstructed by a reservoir. Depending on the optical properties of the reservoir, the obstruction becomes a loss of brightness (absorption) or increase of crosstalk (undesirable modulation by neighbouring pixels).

(iv) Non-functional areas in the maximum light-modulating state give rise to non-uniform area of light modulation.

The invention uses the direction 125 in FIG. 12 as a design parameter in the design and relative alignment and orientation of the pixel array with respect to the lenticular array. In particular, the first direction 125 is parallel to the elongate axis or parallel to the pixel column direction. In either case, because of the generally small slant of the lenticular lenses to the pixel column direction, the direction 125 is generally parallel with the lenticular lens elongate axis.

Thus, the invention is based on constructing the pixels such that the "roll-out" direction is essentially perpendicular to the lenticular pitch direction, i.e. along the lens axis direction.

As outlined above, the roll out direction can be considered to be a vector which defines the change in shape of the modulating area.

The reservoir, i.e. smallest pixel shape, is also preferably shaped along the pitch direction, i.e. it extends across the pixel width.

The lenticular design and the reservoir shapes and positions are preferably chosen such that each 3D view interacts with an equal number of the reservoirs Each 3D view can be defined as coming from a line parallel to the lenticular lens axis. All points along this line are directed in the same direction by the lenticulars. This line will overlap with a line of pixels. By having the reservoirs extending fully across the pixel in the lenticular width direction, all of these lines will cross the reservoir and the open part of each pixel that is crossed, so that each viewing direction will be influenced by the same ratio of reservoir area to open pixel area.

The lenticular design and the maximum light-modulating shape and positions are also preferably chosen such that each 3D view interacts with an equal number of the of the maximum light modulating shapes. Again each viewing direction will be influenced by the same ratio of reservoir area to open pixel area.

In all extreme and intermediate states, banding is avoided by choosing an appropriate pixel shape.

Figure 16:
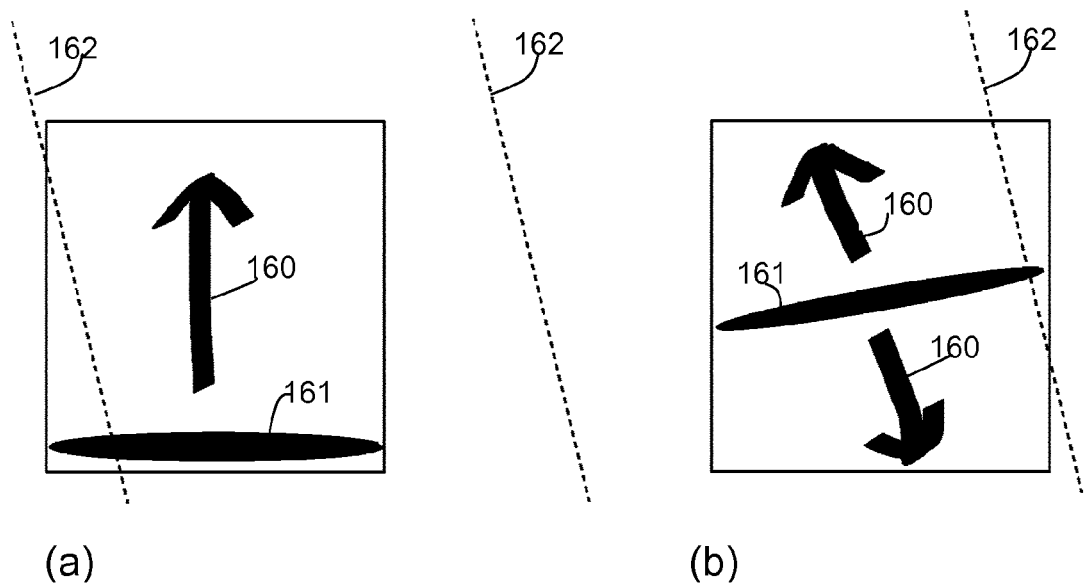
FIG. 16 shows two examples of arrangement of the invention.

FIG. 16 shows a roll-out direction 160 from the reservoir 161, which for example corresponds to the main direction of the flow of particles in case of electrophoretic displays. The dotted lines 162 simply represent the lens elongate axis direction. In the case of electrowetting and electrofluidic displays, the direction 160 represents the main direction of the shape change of the coloured droplets. For MEMS devices there could actually be a physical roll making the definition clear, but otherwise the direction 160 again generally corresponds to the main direction of change in the light-modulating effect as explained and defined above.

The roll-out direction is designed to be close to parallel to the optical axes of the lenticular sheet. In FIG. 16 (left image), the roll-out direction is in the column direction which is close to parallel to the lenticular axis 162, while FIG. 16 (right image) shows a roll-out direction exactly parallel to the optical axes 162.

If the roll out direction is instead arbitrary or perpendicular to the optical axes, then the light-modulating effect is not evenly represented in all views, which results in a banding effect. This effect may only be visible during transitions, but some of the technologies outlined above suffer from slow transitions. For video content, fast transitions are required and there are many of them.

Figure 17:
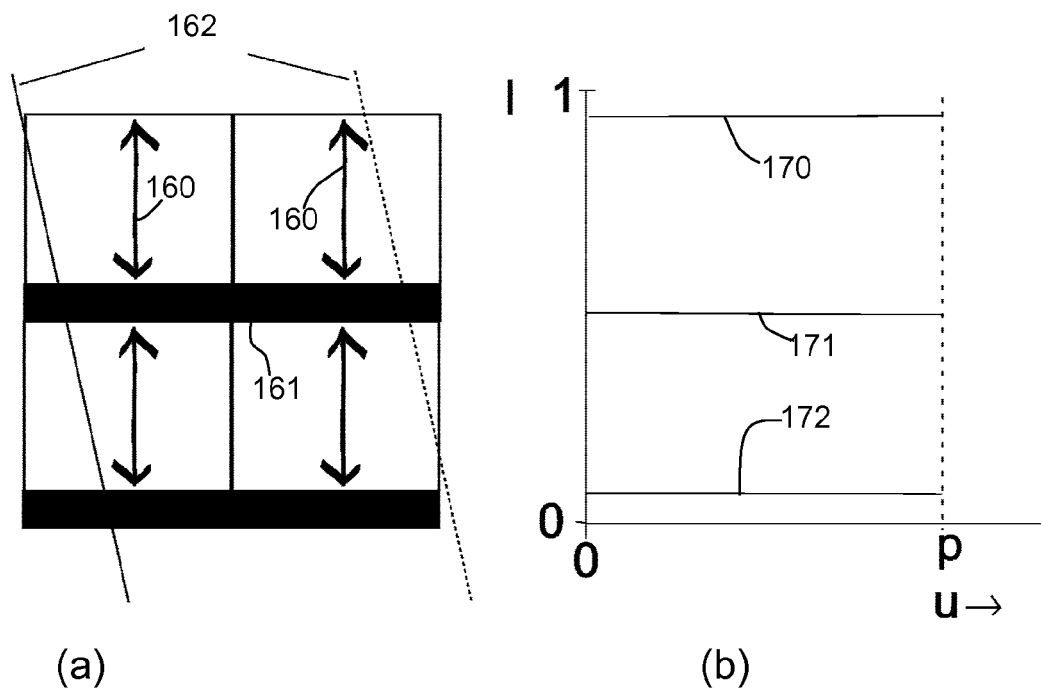
FIG. 17 shows how the banding is reduced for the example of FIG. 16(a)

FIG. 17(a) shows the pixel structure of FIG. 16(a) for an array of four pixels and the different intensity profiles are shown in FIG. 17(b) (in the same way as shown in FIG. 14(b)). Plot 170 is for full modulation (black), plot 171 is for an intermediate pixel level and plot 172 is for white pixels.

It can be seen that the plots have become flat so that the optical modulation effect is uniform across the lens pitch direction, which avoids view-based banding.

The effect does not depend on an accurate alignment so if a lenticular sheet has a typical slant angle $\tan(\varphi)=\frac{1}{6}$ than a vertical (column direction) roll-out direction as in FIG. 16(a) would suffice. However, the roll out direction 160 along the lens axis as in FIG. 16(b) is preferred. A typical slant ratio for 3D lenticular displays is 1:6 but 1:3 is also used. More slanted than 1:2 is uncommon as most of the parallax should be in horizontal direction.

The invention can use reservoirs which roll out along the pixel column direction or along the lens axis direction. The roll out direction can also be offset slightly from either of these directions, and at any angle between the two directions. Thus, the roll out direction is typically within 10 degrees of the column direction or lens axis direction. A lens pitch of ⅙ corresponds to 9.5 degrees. In this case, and assuming vertical columns, the roll out direction extends between minus 10 degrees and 19.5 degrees. A lens pitch of ⅓ corresponds to 18.4 degrees. In this case, and assuming vertical columns, the roll out direction extends between minus 10 degrees and 28.4 degrees.

More preferably, the roll out direction is within 5 degrees of the pixel column direction or the lens axis direction, or between the lens axis and pixel column directions (i.e. minus 5 degrees to 24.5 degrees for slant of ⅙ or minus 5 degrees to 23.4 degrees for slant of ⅓).

With multiple stacked display structures (to create full colour from two-colour individual layers) it is not required that the roll-out direction of the individual layers is identical, nor that the volumes are exactly on top of each other. The roll-out direction of all layers should be similar to the optical axes of the lenticular sheet.

The reservoirs should be shaped and positioned such that they do not contribute to banding in any state. If the reservoirs are covered by opaque material, then the reservoir has the same appearance in all states, but it is also possible that the reservoir has a strong light-modulating effect in the off-state and a weaker light-modulating effect in the on-state.

FIG. 16 gives two examples of banding-free reservoir shapes.

Figure 18:
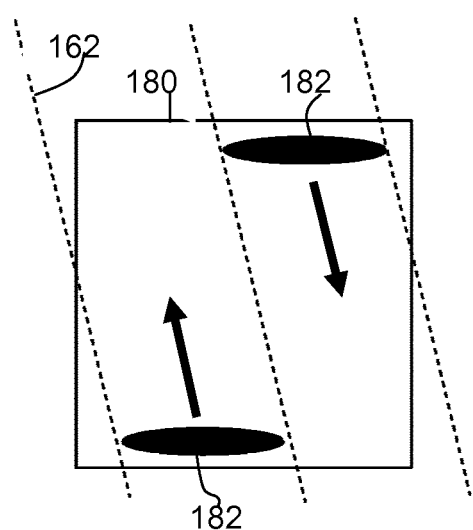
FIG. 18 shows a further example of arrangement of the invention.

FIG. 18 provides a further example. In FIG. 18 the pixel area 180 has two reservoirs 182,184, each extending across the lens width and having a roll out direction parallel to the elongate axis. As mentioned above, the dotted lines 162 simply represent the lens elongate axis direction. As is conventional, one lens covers multiple pixels in the width direction in order to generate the different views to different viewing directions.

There can be more reservoirs per pixel.

The reservoirs are also preferably parallel to the plane of the lenticular sheet. This also ensures that their shadows hit only a small part of the pixel surface.

At each grey-level (or colour) and during each grey-to-grey (or colour-to-colour) transition, all intermediate shapes should have no banding. For any specific state, banding is avoided if, when integrating along the lenticular sheet, an equal amount of light-modulating effect is present. This is not the case for shapes such as in 14 because the reservoir is limited to one corner.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An autostereoscopic display device comprising:
   a display panel comprising rows and columns of pixels, and
   a lenticular array provided over the display panel,
   wherein the lenticular array comprises a side by side row of lenticular lenses each having a parallel elongate axis,
   wherein the display panel comprises light modulating pixels in which the degree of light modulation is controllable between at least two states, a first state in which a light modulating medium occupies a first area of the pixel and a second state in which the light modulating medium occupies a second area of the pixel,
   wherein the transition between first and second states involves movement of the light modulating medium generally in a first direction which is the direction from the centre of area of the first area to the centre of area of the second area, wherein the first direction is within 10 degrees of the parallel elongate axis or within 10 degrees of the pixel column direction, or between the parallel elongate axis and the pixel column direction.

2. The device of claim 1, wherein the first direction is within 5 degrees of the elongate axis or within 5 degrees the pixel column direction, or between the elongate axis and the pixel column direction.

3. The device of claim 1, wherein the elongate axis and the pixel column direction are at an angle having a tangent of ⅓ or ⅙.

4. The device of claim 1, wherein the first direction is parallel to the elongate axis direction.

5. The device of claim 1, wherein in the first state, the light modulating medium occupies a reservoir area.

6. The device of claim 5, wherein the reservoir area is an elongate shape perpendicular to the pixel column direction.

7. The device of claim 1, wherein the display panel comprises an electrophoretic display panel.

8. The device of claim 1, wherein the display panel comprises an electrowetting display panel.

9. The device of claim 1, wherein the display panel comprises a MEMS shutter based display panel.

10. A method of controlling an autostereoscopic display device which comprises a display panel comprising rows and columns of pixels, and a lenticular array provided over the display panel, wherein the lenticular array comprises a side by side row of lenticular lenses each having a parallel elongate axis, wherein the method comprises controlling the degree of light modulation of the pixels between at least two states, a first state in which a light modulating medium occupies a first area of the pixel and a second state in which the light modulating medium occupies a second area of the pixel, wherein the transition between first and second states involves movement of the light modulating medium generally in a first direction which is the direction from the centre of area of the first area to the centre of area of the second area, wherein the first direction is within 10 degrees of the parallel elongate axis or within 10 degrees of the pixel column direction, or between the parallel elongate axis and the pixel column direction.

11. The method of claim 10, wherein the first direction is within 5 degrees of the elongate axis or within 5 degrees the pixel column direction, or between the elongate axis and the pixel column direction.

12. The method of claim 10, wherein the first direction is parallel to the elongate axis direction.

13. A device, comprising:

a display panel comprising a plurality of pixels arranged in rows extending in a pixel row direction and columns extending in a pixel column direction, and an array of lenticular lenses arranged side by side and disposed over the display panel, each of the lenticular lenses having a width and a length which is greater than the width and having an elongate axis which extends in a same direction as the length of the lenticular lens, the elongate axes of the lenticular lenses being in parallel with each other, wherein the display panel comprises a plurality of light modulating pixels each having a light modulating medium in which the degree of light modulation is controllable between at least two states, including a first state in which the light modulating medium occupies a first area of the pixel and a second state in which the light modulating medium occupies a second area of the pixel, wherein the light modulating medium moves generally in a first direction from a center of area of the first area to a center of area of the second area to cause the pixel to transition between the first state and the second state, and wherein the first direction is within 10 degrees of one of the elongate axes or within 10 degrees of the pixel column direction, or between the elongate axis and the pixel column direction.

14. The device of claim 13, wherein the first direction is within 5 degrees of the one of the elongate axes or within 5 degrees the pixel column direction, or between the elongate axis and the pixel column direction.

15. The device of claim 13, wherein the first direction is parallel to the elongate axis direction.

16. The device of claim 13, wherein the elongate axes and the pixel column direction are at an angle having a tangent of ⅓ or ⅙.

17. The device of claim 13, wherein in the first state, the light modulating medium occupies a reservoir area of the pixel.

18. The device of claim 13, wherein the display panel comprises an electrophoretic display panel.

19. The device of claim 13, wherein the display panel comprises an electrowetting display panel.

20. The device of claim 13, wherein the display panel comprises a MEMS shutter based display panel.

* * * * *